United States Patent
Niederst et al.

(10) Patent No.: US 7,511,098 B2
(45) Date of Patent: Mar. 31, 2009

(54) HARDENABLE COMPOSITIONS COMPRISING POLYACID(S) AND POLYOL(S)

(75) Inventors: Jeffrey Niederst, Pittsburgh, PA (US); John H. Mazza, Cheswick, PA (US); Mike A. Lucarelli, McMurray, PA (US); William H. McCarty, Lancaster, VA (US); Thomas R. Mallen, Zelienople, PA (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

(21) Appl. No.: 10/333,029

(22) PCT Filed: Jul. 11, 2001

(86) PCT No.: PCT/US01/21748

§ 371 (c)(1),
(2), (4) Date: Jul. 23, 2003

(87) PCT Pub. No.: WO02/06412

PCT Pub. Date: Jan. 24, 2002

(65) Prior Publication Data

US 2004/0037957 A1    Feb. 26, 2004

Related U.S. Application Data

(60) Provisional application No. 60/218,592, filed on Jul. 17, 2000.

(51) Int. Cl.
  *C09D 163/00*  (2006.01)
  *C09D 5/00*  (2006.01)
  *C09D 133/02*  (2006.01)
  *C09D 137/00*  (2006.01)
  *C09D 139/00*  (2006.01)

(52) U.S. Cl. .................. 525/119; 525/113; 525/380; 525/381; 525/382

(58) Field of Classification Search ............... 525/165, 525/175, 119, 113, 380, 381, 382
See application file for complete search history.

(56) References Cited

U.S. PATENT DOCUMENTS

| | | | |
|---|---|---|---|
| 3,026,281 A | | 3/1962 | Harren et al. |
| 3,541,045 A | * | 11/1970 | Jabloner ................... 524/796 |
| 3,784,396 A | * | 1/1974 | Fourment et al. ........... 427/195 |
| 4,075,242 A | | 2/1978 | Rhum et al. |
| 4,138,541 A | * | 2/1979 | Cenci et al. ................ 524/233 |
| 4,164,488 A | | 8/1979 | Gregorovich et al. |
| 4,190,693 A | * | 2/1980 | Martorano et al. .......... 428/209 |
| 4,276,432 A | | 6/1981 | Rhum et al. |
| 4,857,622 A | | 8/1989 | Bousquet et al. |
| 4,937,114 A | * | 6/1990 | Wasson et al. ............. 428/35.8 |
| 4,960,522 A | | 10/1990 | Amjad et al. |
| 4,963,602 A | | 10/1990 | Patel |
| 5,545,348 A | | 8/1996 | Savio |
| 5,750,613 A | * | 5/1998 | Blum et al. ................ 524/457 |
| 5,905,105 A | * | 5/1999 | Jones et al. ................ 524/413 |
| 6,099,773 A | * | 8/2000 | Reck et al. ................ 264/109 |

FOREIGN PATENT DOCUMENTS

| | | | |
|---|---|---|---|
| AU | 200071927 A1 | | 5/2001 |
| CA | 2163331 | | 5/1996 |
| DE | 864 151 | | 1/1953 |
| DE | 864151 A | * | 1/1953 |
| DE | 1 769 695 | | 4/1971 |
| DE | 1769695 A | * | 10/1971 |
| EP | 0 157 133 A1 | | 10/1985 |
| EP | 0 342 976 A1 | | 11/1989 |
| EP | 0 758 007 A2 | | 2/1997 |
| EP | 0 826 710 A2 | | 3/1998 |
| EP | 826710 A2 | * | 3/1998 |
| GB | 1 480 368 | | 7/1977 |
| GB | 1 489 485 | | 10/1977 |
| GB | 1 555 995 | | 11/1979 |
| GB | 1 599 382 | | 9/1981 |
| JP | 51-132295 | | 3/1975 |
| JP | 51132295 A | * | 11/1976 |
| JP | 56-104905 | | 8/1981 |
| JP | 2-51531 | | 2/1990 |
| JP | 02051531 A | * | 2/1990 |
| WO | WO 94/12570 | | 6/1994 |
| WO | WO 97/31059 | | 8/1997 |
| WO | WO 9731059 A1 | * | 8/1997 |

OTHER PUBLICATIONS

Translation to JP 51132295 A (Nov. 17, 1976).*
"Binders for paints and varnishes—Determination of acid value—Titrimetric method," *International Standard*, Zuerich, CH, ISO 3682:1996(E), pp. 1-3.

* cited by examiner

*Primary Examiner*—Kelechi C Egwim
(74) *Attorney, Agent, or Firm*—Shumaker & Sieffert, P.A.

(57) ABSTRACT

The present invention provides hardenable coating compositions, comprising: a first compound selected from the group consisting of polyacids, polyanhydrides, salts thereof and mixtures thereof, and a second compound having two or more active hydrogen groups. When used as a roll coating composition, the first compound preferably has a low average molecular weight and an acid number greater than about 100. The hardenable coating composition preferably has an extended open time and can be rapidly cured to a substantially tack-free state in less than about one minute at 200° C. Coated articles and methods of coating are also provided.

17 Claims, No Drawings

HARDENABLE COMPOSITIONS COMPRISING POLYACID(S) AND POLYOL(S)

RELATED APPLICATIONS

This application is a National Stage application of under 35 U.S.C. §371 and claims benefit under 35 U.S.C. §119(a) of the International Application No. PCT/US01/21748 having an International filing date of Jul. 11, 2001, which claims the benefit of U.S. Provisional Application No. 60/218,592, filed on Jul. 17, 2000 each of which is hereby incorporated in its entirety.

BACKGROUND

Painted metal containers (e.g., steel or aluminum cans) are now used prolifically for packaging foods and beverages. To that end, in 1999, one corporation manufactured over 37 billion aluminum cans for the United States beverage industry alone. Metal containers such as aluminum cans may be painted, e.g., by rolling individual cans against paint-covered rubber cylinders. Often a clear protective coating is applied to protect this exterior paint coat from smearing, marring, or degradation. Cans are then conveyed through ovens for curing and drying of the coating.

Investigators continue to search for new coating compositions that can be used in container mass production applications. One goal is to develop coating compositions that are ready for immediate use without additional preparation steps (i.e., that are "one-stage"). The compositions of interest must be stable in bulk quantities at standard temperature and pressure so that they may be efficiently and cost effectively shipped and stored without gellation or degradation prior to use. They also must be able to withstand the conditions of processing. When applied to substrates, the compositions must cure and dry rapidly (i.e., possess "snap cure" capabilities), have good adhesion to metal and other materials, be scratch resistant, and have a clear and glossy appearance.

New exterior coating compositions that meet these requirements are being developed. Many of these coatings, however, are variants of formulations employed traditionally in the packaging industry, including phenol/formaldehyde, urea/formaldehyde, and melamine/formaldehyde formulations. However, the widespread use of formaldehyde in production scale applications is falling into disfavor because of perceived environmental and health considerations. Formaldehyde is an eye and skin irritant that is a suspected carcinogen. The unfavorable environmental and toxicological profiles of formaldehyde have spurred researchers to develop new coating formulations that contain formaldehyde scavengers. Unfortunately, such coatings have many shortcomings. For example, resins containing formaldehyde scavengers such as melamine, urea, or ammonia, frequently have low water tolerance and require the need for stabilizing emulsifiers. Rogue formaldehyde emissions, as well as additional, stability-related problems associated with heating and curing operations, also pose complications.

In addition to the environmental concerns about formaldehyde, there is additional interest in reducing the levels of volatile organic compounds (VOCs) in industrial products such as coating compositions. This interest is in part due to governmental regulations limiting the industrial use of and the resulting emissions of these into the atmosphere. Consequently, many of the coating compositions presently available do not meet the new regulations.

As a result, there is a need in the packaging industry for substantially formaldehyde-free hardenable compositions that are easy to use. There is also a need for compositions that exhibit favorable crosslinking and coating characteristics. In particular, there is a need to develop coating compositions and formulations that are stable at standard temperature and pressure (i.e., 25° C. and 1 atmosphere) so that they can be transported and stored in bulk prior to use in production scale operations. There is also a need for coating compositions and formulations that have stability and curing profiles that comport with production scale applications and are snap-curable, that adhere to substrates such as metal, that have a clear, glossy appearance, and that are mar resistant.

It also would be useful to prepare formaldehyde-free roll coating compositions that are non-misting. The coating compositions of the present invention solve these and other problems.

SUMMARY

The present invention relates generally to hardenable or curable compositions (e.g., coating compositions suitable for coating substrates such as metal cans).

Preferred compositions of the present invention incorporate (i) a first compound selected from the group consisting of polyacids, polyanhydrides, salts thereof and mixtures thereof, having an acid number greater than about 100, and (ii) a second compound having two or more active hydrogen groups.

When used in roll coating operations these preferred compositions have extended pen time. While not intending to be bound by theory, it is believed that open time is extended when compositions are capable of readily re-dissolving with an additional application of the composition. For example, a composition might be prevented from drying out on a coating roll if it readily re-dissolves into "wet" composition that contacts the roll.

Preferred compositions cure and dry rapidly (i.e., possess "snap cure" capabilities), have good adhesion to metal and other materials, are scratch resistant, and have a clear and glossy appearance. Preferred roll coating compositions are also no more than slightly misting and more preferably are non-misting.

DEFINITIONS

The terms related to hardenable compositions and methods for coating substrates are used in accordance with the understanding of one skilled in the art, unless otherwise noted. For example, as used herein:

The terms "solids content"; "percent solids"; "coating solids" and "coating solids component" refer to the sum of the mass of components used in the composition exclusive of water or organic solvent as a percentage of the total composition mass inclusive of any water or organic solvent.

The term "extended open time" refers to the time that a roll coating composition can be used continuously on an open roll coater without becoming hardened on the roll and causing coating problems such as streaks, etc. Extended open time may be assessed for a roll coating composition by performing an air-drying test. This test, as described herein, measures the ability of a liquid coating, applied to yield a dry film thickness of 2.2+/−0.63 g/m$^2$, to remain tacky at room temperature (25° C.). Preferred coatings remain tacky for at least 15 minutes at room temperature, more preferred coatings remain tacky for at least 30 minutes at room temperature, and most preferred coatings remain tacky for at least one hour at room temperature.

The term "substantially formaldehyde-free" means that the compositions of the present invention are contaminated with, or liberate as a result of curing, no more than about 1 percent by weight formaldehyde. The term "essentially formaldehyde-free" means that the compositions of the present invention are contaminated with, or liberate as a result of curing, no more than about 0.5 percent by weight formaldehyde. The term "essentially completely formaldehyde-free" means that the compositions of the present invention are contaminated with, or liberate as a result of curing, no more than about 0.25 percent by weight formaldehyde. The term "completely formaldehyde-free" means that the compositions of the present invention are contaminated with, or liberate as a result of curing, less than 5 parts per million (ppm) formaldehyde.

The term "snap cure" refers to the ability of the composition to cure rapidly. For roll coating compositions "snap cure" means that the composition can cure to a substantially tack-free state in less than about one minute at 200 degrees C. More preferred compositions can cure to a substantially tack-free state in less than 30 seconds at 200 degrees C.

The term "solvent" refers to a volatile liquid component of the composition that does not react during the curing or heating steps. Most of the solvent is generally volatilized during a heating step and does not become incorporated into the cured coating.

The term "one-stage" means that all of the components are present in a single "ready-to-use" formulation that is provided to a user.

The term "active hydrogen group" means a chemical functional group that can react under certain conditions with an acid, an anhydride, a salt thereof, or the like. In the context of the present invention, active hydrogen groups include alcohols, primary and secondary amines, thiols, and the like.

The term "active hydrogen group compound" means a chemical compound that contains one or more active hydrogen groups.

The term "extended epoxy resins" means an epoxy resin that has been chain extended.

The term "quaternized epoxy resin" means an epoxy resin that has undergone reaction with a tertiary amine. In this process, a tertiary amine attacks one or more epoxide groups of the epoxy resin.

The term "polyacid" means a polymer (e.g., a homopolymer or co-polymer) that comprises a plurality of acidic functional groups. A polyacid may be, for example, derived from ethylenically unsaturated acids or mixtures of ethylenically unsaturated acids and other monomers (e.g., vinyl monomers).

The term "polyanhydride" means a polymer (e.g., a homopolymer or co-polymer) that comprises a plurality of anhydride functional groups. A polyanhydride may be, for example, derived from ethylenically unsaturated anhydrides or mixtures of ethylenically unsaturated anhydrides and other monomers (e.g., vinyl monomers).

The term "shelf-stable" means that compositions such as the one-stage coating composition do not undergo degradation, crosslinking, or other undesirable processes at standard temperatures and pressures for prolonged periods. Preferred compositions are shelf-stable for at least one month, more preferred compositions are shelf-stable for at least three months, most preferred compositions are shelf-stable for at least six months, and optimally are shelf-stable for at least one year.

The term "vinyl monomer" refers to ethylenically unsaturated compounds that can react under conditions that form polymeric compounds.

DETAILED DESCRIPTION

The hardenable coating compositions of the present invention preferably incorporate (i) a first compound having an acid number greater than about 100, and (ii) a second compound having two or more active hydrogen groups.

In one embodiment, the hardenable coating compositions of the present invention are useful for coating on substrates (e.g., the roll coating of hardenable compositions on metal cans). The materials for the preferred hardenable coating compositions include a First compound (e.g., a polyacid) and a second compound (e.g., an active hydrogen group compound). Suitable materials are typically combined in liquid media (e.g., water or mixed solutions of water and water miscible organic liquids or emulsions). When combined in liquid media, the polyacid and active hydrogen group compound of the preferred one-stage coating compositions form flowable mixtures that can be shipped and stored at standard temperature and pressure without commercially unacceptable increases in coating viscosity or unsatisfactory changes in coating properties due to gellation or other degradative processes. They additionally have drying and curing profiles that comport with production scale operations.

Preferably, the one-stage formulations form shelf-stable flowable mixtures in liquid media such as water or mixtures of water and water miscible organic liquids. Also, they can be shipped and stored at standard temperature and pressure without unacceptable increases in viscosity or unsatisfactory changes in properties (e.g., coating properties) due to gellation or other degradative processes.

The invention also relates to substrates that are coated with hardenable coating compositions. The hardenable coating compositions may be applied by conventional techniques to a wide variety of substrates (e.g., metal, plastic, wood, concrete, asphalt, etc.) in the form of sheets, strips or coils. Metal coated substrates are especially useful in the packaging, processing, and holding of foods and beverages. In addition, the hardenable compositions of the invention may be used as a binder for products such as wood laminates and the like.

The coatings are typically applied on a substrate by a process such as, for example, lamination, solution or dispersion coating, spraying (e.g., air or airless spraying, electrostatic spraying, etc.), roll coating, reverse roll coating, padding, saturating, dip coating or the like. Coating compositions can also be applied as a film by extrusion in melt form through an extrusion coating die onto a substrate.

After application to a substrate, the composition typically is then hardened. In one embodiment, the composition is heated and dried to remove any optional solvents or carriers and cure the hardenable composition. Preferred hardenable coating compositions form hard solids when cured that protect the substrate (e.g., protect a metal can from scratching or marring). The invention also relates to substrates that are impregnated with hardenable compositions.

Suitable compositions of the present invention may be formulated having a wide variety of solids content depending upon the application of the composition. Electro-coat compositions of the present invention might have a relatively low solids content (e.g., 10% or so), compositions for spray application might have a 20% or so solids content, while still other compositions might have a 100% solids content. The preferred solids content for a particular application can be selected by those skilled in the art. Typical roll coating composition of the present invention have a relatively high solids content. Preferred roll coating compositions (e.g., can exterior varnish coatings) will have from about 20% to about 80%, more preferably from 30% to 70%, and most preferably from 35% to 50% solids content, by weight.

Suitable first compounds of the present invention include linear or branched polymers which possess pendant acid groups (or anhydride or salt groups thereof) and which are sufficiently nonvolatile so that they will remain available for reaction with the other starting materials during hardening (e.g., heating and drying) operations.

Suitable pendant acid groups for the present invention include sulfonic acid groups, phosphonic acid groups, carboxylic acid groups or the like. Preferred acid groups are carboxylic acid groups. Suitable pendant anhydride groups for the present invention include anhydrides of the aforementioned acid groups.

Suitable pendant salt groups include salts of the aforementioned acids, including sodium, lithium, potassium, magnesium, calcium, aluminum, ammonium, phosphonium and quaternary ammonium salts. Preferred salts include sodium, lithium, potassium, ammonium, phosphonium and quaternary ammonium salts. If desired, a portion of the pendant acid groups may be converted to the salt. For example, a portion of the pendant acid groups may be converted to a salt with an amine (e.g., excess amine that was used to form a quaternized epoxy resin as discussed below).

Suitable first compounds of the present invention include polyacids, Polyanhydrides, salts thereof, or mixtures thereof having an acid number greater than About 100. Preferred compounds have an acid number in the range of from about 100 to 863, more preferably from about 200 to 700, and most preferably from about 250 to 600. The acid number as used in reference to the present compositions is the number of milligrams of potassium hydroxide required to neutralize one gram of the solid polyacid polymer. The acid number of an anhydride-containing polymer is determined by initially hydrolyzing the anhydride-containing polymer to obtain the corresponding polyacid polymer. After drying, the acid number is then determined in the same manner as for a polyacid polymer. The acid number of a salt compound may be determined as the number for a like acid compound that has not been converted to the salt.

A high acid number is generally preferred. While not intending to be bound by theory, it is believed that the acid number should be high enough to facilitate the formation or reformation of a sufficient amount of anhydride during cure. Anhydride formation (which may be intermolecular but that is more likely intramolecular) is believed to be an integral part of the curing mechanism. Consequently, polyacids having a low acid number are believed to be less efficient in the formation or reformation of anhydride (e.g., due to the greater separation between acid groups) and are thus less efficient in the curing process.

Preferred polyacid or polyanhydride polymers include homopolymers or copolymers prepared from ethylenically unsaturated carboxylic acid or carboxylic anhydride monomers and other optional monomers. The acid or anhydride monomers may be polymerized alone or with one or more additional vinyl monomers. Low molecular weight polymers are preferred for certain applications as is discussed herein.

Ethylenically unsaturated acids and anhydrides suitable for the present invention include compounds having from about 3 to about 20 carbons, 1 to 4 sites of unsaturation, and from 1 to 5 acid or anhydride groups or salts thereof.

Non-limiting examples of useful ethylenically unsaturated acid monomers include acids such as, for example, acrylic acid, methacrylic acid, crotonic acid, fumaric acid, maleic acid, cinnamic acid, 2-methyl maleic acid, itaconic acid, 2-methyl itaconic acid, $\alpha,\beta$-methyleneglutaric acid, and the like or mixtures thereof. Preferred unsaturated acid monomers include acrylic acid, methacrylic acid, crotonic acid, fulmaric acid, maleic acid, 2-methyl maleic acid, itaconic acid, 2-methyl itaconic acid and mixtures thereof. More preferred unsaturated acid monomers include acrylic acid, methacrylic acid, crotonic acid, fumaric acid, maleic acid, itaconic acid, and mixtures thereof. Most preferred unsaturated acid monomers include acrylic acid, methacrylic acid, maleic acid, crotonic acid, and mixtures thereof.

Non-limiting examples of suitable ethylenically unsaturated anhydride monomers include compounds derived from the above acids (e.g., as pure anhydride or mixtures of such). Preferred anhydrides include acrylic anhydride, methacrylic anhydride, and maleic anhydride.

Suitable co-monomers for polymerization with the ethylenically unsaturated carboxylic acid or an ethylenically unsaturated anhydride monomers include vinyl monomers such as styrene, $\alpha$-methyl styrene, acrylonitrile, methacrlonitrile, methyl acrylate, ethyl acrylate, ethylhexyl acrylate, n-butyl acrylate, hydroxyethyl acrylate, hydroxyethyl methacrylate, hydroxypropyl acrylate, hydroxypropyl methacrylate, isobutyl methacrylate, glycidyl methacrylate, vinyl methyl ether, vinyl acetate, and combinations. Preferred vinyl monomers are styrene, $\alpha$-methyl styrene, and ethylhexyl acrylate.

Suitable first compounds (e.g., polyacid or polyanhydride polymers) useful in practicing the present invention include polymers having a wide variety of molecular weights, depending on the final use application of the composition. For coating applications the molecular weight should be selected such that the final composition has the desired coating properties as well as the desired cured physical properties. For example, when the composition is used in a spray application the molecular weight should be tailored to avoid veiling. When used in a roll coating operation the molecular weight should be tailored to avoid misting and/or to optimize effective open time. A preferred weight average molecular weight range for roll-coating operations is between about 500 and 20,000 Daltons. A more preferred weight average molecular weight range for roll-coating operations is between about 750 and 10,000 Daltons. A most preferred weight average molecular weight range for roll coating operations is between about 1,000 and 5,000 Daltons.

Suitable hardenable compositions of the present invention also contain at least one suitable second compound (e.g., an active hydrogen group compound). Preferred second compounds are believed to function as crosslinking agents that react with the first compound under curing or hardening conditions.

If desired, the first compound and the second compound may be provided in a single combined compound. Such a combined compound would comprise functional moieties of both the first compound (e.g., pendant acid groups, etc. as discussed above) and the second compound (e.g., active hydrogen groups as discussed below). For purposes of this application, the first and second compounds will be discussed as separate compounds. However, it is understood that a combined $1^{st}/2^{nd}$ compound might be employed as well.

Suitable second compounds useful as starting materials to prepare the hardenable compositions of the present invention include compounds (such as, for example, alkylene, arylene, and/or arylalkylene compounds) containing at least two active hydrogen groups, such as hydroxy groups, primary or secondary amino groups, thiol groups, or combinations thereof. More preferred second compounds are sufficiently nonvolatile that they remain substantially available for reaction with the other components of the composition during hardening (e.g., heating and curing).

For certain applications, e.g., water-based roll coating compositions, preferred second compounds include water soluble polyols or polyamines. Di-functional compounds, tri-functional compounds, multi-functional compounds, or mixtures thereof may be used.

Suitable active hydrogen group compounds may be used alone or combined with one or more additional active hydrogen group compounds to achieve higher levels of crossliiking in the cured coating compositions.

Suitable active hydrogen group compounds include, but are not necessarily limited to glycerol, ethylene glycol, propylene glycol, trimethylol propane, triethethylol ethane, ethylene diamine, ethanolamine, propanolamine, butanolamine, pentanol amine, diethanolamine, triethanolamine, pentaerythritol, sorbitol, sucrose, bisphenol A, quaternized epoxy resins, trihydroxyethyl isocyanurate, resorcinol, catechol, gallol, and various other polyols. The active hydrogen group compounds may also be addition polymers containing at least two hydroxyl groups such as, for example, polyvinyl alcohol, partially hydrolyzed polyvinyl acetate, or homopolymers or copolymers of hydroxyethyl methacrylate, hydroxypropyl methacrylate, and the like.

Although a variety of epoxy resins are useful for preparing the active hydrogen group compounds, the epoxy resins are preferably epoxy resins with at least two epoxide groups. Suitable epoxy resins include glycidyl ethers or glycidyl esters of aromatic or alkylaromatic moieties. Suitable epoxy resins include aromatic polyethers based on the bisphenol structure that contain terminal epoxide functionality and active hydrogen groups. Preferred epoxy resins have at least two terminal epoxide groups. Preferred epoxy resins are similarly functionalized and have a number average molecular weight of up to 5,000 and an epoxy equivalent weight of up to 2,500. More preferred epoxy resins have a number average molecular weight of about 1,000 to 5,000 and an epoxy equivalent weight of about 500 to 2,500. Most preferred epoxy resins have a number average molecular weight of 2,000 to 4,000 and an epoxy equivalent weight of about 1,000 to 2,000. Commercially available epoxy polymers include EPON™ 828, 1001, 1004, 1007, 1009, 2004 resins, available from the Shell Chemical Co., Houston, Tex.

Active hydrogen compounds suitable for practicing the invention can be prepared from epoxy resins. In one embodiment, an epoxy resin and a tertiary amine are reacted to provide a compound that has active hydrogen groups and quaternary amine groups. This reaction can conveniently be carried out at a temperature of about 70°-120° C. Alternatively, the epoxy resin may be reacted with the tertiary amine to form a resin having quaternary ammonium hydroxide groups that are subsequently converted into quaternary ammonium acid salts through reaction with the acid. The acids typically include polyacids, carboxylic acids, sulfonic acids, and/or phosphorus-based acids.

Suitable second compounds useful in practicing the present invention include compounds having a wide variety of molecular weights, depending on the final use application of the composition. For coating applications the molecular weight of the second compound should be selected such that the final composition has the desired coating properties as well as the desired cured physical properties. For example, when the composition is used in a spray application the molecular weight should be tailored to avoid veiling. When used in a roll coating operation the molecular weight should be tailored to avoid misting and/or to optimize effective open time. A preferred weight average molecular weight of the second compound for roll-coating operations is less than about 20,000 Daltons. A more preferred weight average molecular weight range for roll-coating operations is between about 100 and 20,000 Daltons. A most preferred weight average molecular weight range for roll coating operations is between about 200 and 10,000 Daltons. An optimal weight average molecular weight range for roll coating operations is between about 300 and 5,000 Daltons.

The hardenable compositions of the present invention may also include along with the polyacid and the active hydrogen group compound, other optional additives. Suitable optional additives that may be incorporated in the formulations include, for example, carriers (e.g., solvents), catalysts, stabilizers, initiators, photoinitiators, emulsifiers, pigments, fillers, anti-migration aids, curing agents, coalescents, wetting agents, biocides, plasticizers, crosslinkers, anti-foaming agents, colorants, waxes, anti-oxidants, viscosity modifiers, reactive diluents (e.g., ethoxylated bisphenol-A's such as SYN FAC 8009, FLO-MO-BIS, etc.), or combinations thereof.

In one embodiment, the compositions of the present invention contain an optional carrier. The carrier may be used, for example, to facilitate application of the composition to the substrate. Preferred carriers include water and non-VOC (e.g., organic) carriers. These preferred carriers might be used alone or with optional co-solvents.

Suitable preferred carriers include: water and non-VOC carriers. A non-VOC carrier is a volatile compound that has a reaction rate with the hydroxyl radical and ultraviolet light (UV) that is faster than ethane. Suitable non-VOC carriers include: chlorobromomethane; 1-bromopropane; n-alkane (C12-C18); t-butyl acetate; perchloroethylene; benzotrifluoride; parachlobenzotrifluoride; acetone; 1,2-dichloro-1,1,2-trifluoroethane; dimethoxymethane; 1,1,1,2,2,3,3,4,4-nonafluoro-4-methoxy butane; 2-(difluoromethoxymethyl)-1,1,1,2,3,3,3-heptafluoropropane; 1-ethoxy-1,1,2,2,3,3,4,4,4-nonafluorobutane; 2-ethoxydifluoromethyl)-1,1,1,2,3,3,3-heptafluoropropoane; methylene chloride; and mineral oils.

Other solvent carriers may be used as well in the compositions of the present invention. Preferred organic solvent carriers are typically made up of saturated organic compounds having a molecular weight of less than about 300 such as lower alcohols, lower alkyl esters, cyclic esters, lower alkyl amides, cyclic amides, lower alkyl ethers, and mixtures thereof. Non-limiting examples include butyl cellosolve, diethylene glycol diethyl ether, glycol dimethyl ether, ethoxy ethyl propionate, butyl carbitol, hexyl carbitol, hexyl cellosolve, butanol, amyl alcohol, propanol, propyl cellosolve, isopropanol, etc.

Preferred compositions have a volatile organic compound level of less than 0.25 kg/l of coating composition and solvent.

In one embodiment, the composition of the present invention contains an optional catalyst. The catalyst may be used, for example, to facilitate cure of the composition.

Suitable catalysts include mineral acids (e.g., sulfuric, phosphonic, polyphosphonic, hydrochloric, hydrobromic, hydroiodic, HF, etc., preferably phosphonic); nitric acid; esters of nitric acid; boric acid; esters of boric acid; organo-sulfonic acids (e.g., methyl sulfonic, p-toluene sulfonic, benzene sulfonic acid, napthylene sulfonic, etc.); organophosphonic; phosphoric acid organic esters (e.g., methyphosphonic acid, ethylphosphonic acid, etc.); and carboxylic acids (e.g., acetic acid, acrylic acid, benzoic acid, etc.). Preferred carboxylic acids have the general formula $R^1$—COOH, where $R^1$ can be H or any alkyl or aryl radical. Preferred sulfonic acids have the general formula $R^2$—$S(O_2)$ OH, where $R^2$ can be H or any alkyl or aryl radical. Preferred phosphonic acids have the general formula $R^3O—P(O)(OR^4)(OR^5)$, where $R^3$, $R^4$, and $R^5$ can be any combination of alkyl or aryl radical or H.

Preferred compositions for use in roll coating applications (e.g., varnishes for can coating operations) are clear when wet. This allows the technicians to rapidly assess the printing operation in real time. Opaque or non-clear wet coatings can obscure the underlying printing thus causing delays in spotting underlying printing problems. Given that many can coating operations run at very high speed any delay spotting the defect results in the waste of a large number of cans.

Suitable hardenable compositions of the invention for use as a roll coating composition have a #4 Ford cup viscosity of about 40 to about 90 seconds at 25° C. Preferred roll coating compositions have a #4 Ford cup viscosity of about 60 to about 85 seconds at 25° C. Most preferred roll coating compositions have a #4 Ford cup viscosity of about 70 to about 80 seconds at 25° C.

The compositions of the present invention are preferably formulated to be shelf-stable one-stage compositions. This permits easy handling by the end user. If desired, however, the composition may be provided in a multi-pack format. In such cases the end user would mix two or more compositions together, e.g., immediately prior to use. Such compositions might have a shorter shelf life after being mixed than the separate components had prior to mixing.

EXAMPLES

The foregoing disclosure provides all the parameters of the present invention. The following illustrative Examples further characterize the invention but are not meant to provide general limitation thereof Test Methods:

The following is an overview of the testing employed to determine the performance of potential coating candidates.

Solution Viscosity:

Quantifies the flow rate of a liquid coating through the orifice of a #4 sized Ford Cup. The measurement is quantified by determining the time (in seconds) the given volume of liquid coating requires to completely flow through this orifice at 25° C. For roll coatings, a flow rate of between 20 and 200 seconds is suitable. Preferably, the flow rate for roll coatings is between 30 and 150 seconds, more preferably between 40 and 120 seconds, most preferably between 60 and 100 seconds, and optimally between 40 and 90 seconds.

Non-Volatile Content:

Quantifies the percentage of a liquid coating that remains 'non-volatile' after undergoing a given heating cycle. For this testing, a sample size of 0.5 g+/−0.02 g of liquid coating is used. This quantity of coating is essentially 'flowed' with 3.0 ml of deionized water, and a baking time of 60 minutes at 110° C. is used to remove volatile components. For roll coatings, a non-volatile content of between 15 and 100% by weight is suitable. Preferably, the non-volatile content of a roll coating is between 20 and 80%, more preferably between 30 and 60%, and most preferably between 35 and 42%.

Calculated VOC Content:

Quantifies the weight of 'non-exempt' volatile organic compounds that are emitted from a gallon of liquid coating during the testing cycle as outlined in the Non-Volatile Content test method described above. Determined values for coatings are expressed in lbs. of organic volatiles per gallon of wet coating. For roll coatings, a maximum VOC content of 0.25 kg or less of volatile organic compounds per liter of wet coating is most desirable. More preferred coatings have less than 0.1 kg/l VOC, and most preferred coatings have less than 0.05 kg/l VOC.

Wet Solution Appearance:

Describes the appearance of a solution of wet coating in terms of clarity, compatibility, etc., as determined by a qualitative visual analysis. For roll coatings it is desirable for the wet coating to be clear and compatible (homogeneous).

Misting/Slinging:

Measures the resistance of a liquid coating to sling or spray away from a cylindrical application roll (e.g., as used in conventional roll coating of liquid coatings) as it comes into contact with uncoated aluminum beverage cans. A laboratory type tester suitable for performing this assessment includes a miniature applicator roll (approximately 69 mm diameter) attached to an electric motor, a separate free rotating miniature roll holding an uncoated aluminum beverage can, and a sheet of glass to collect any wet coating ejected from between the two rolls. A rotation speed of approximately 1000 rpms is determined to be the optimal simulation of commercial application units for these sized rolls. The misting performance is measured by coating the applicator roll with wet coating, setting the roller speed for 1000 rpms, placing in contact with the second miniature roll holding the aluminum beverage can, and measuring liquid coating collected on the sheet of glass over a time period of 20 seconds. The misting performance is qualitatively measured on a 0-10 scale, with a 10 meaning that none of the coating is ejected after 20 seconds. The rating scale is summarized as follows: 0 to 3=heavy undesirable misting (i.e., the glass collected coating over about 30% or more of the surface); 4 to 6=moderate misting (i.e., the glass collected coating over about 11 to 29% of the surface); 7 to 9=slight misting (i.e., the glass collected coating over about 2 to 10% of the surface); 10=no misting (i.e., the glass collected coating over less than about 1% of the surface), at 20 seconds. For roll coatings, a misting rating of 7 or greater is considered desirable.

Air Drying:

Measures the ability of a liquid coating, applied to yield a dry film thickness of 2.2+/−0.63 g/m², to remain tacky at room temperature. As described in the tables, a coating is considered a PASS if it remains tacky for at least 15 minutes at room temperature and a FAIL if it is tack free prior to the 15-minute mark. More preferred coatings remain tacky for at least 30 minutes, and most preferred coatings remain tacky for at least one hour under these conditions.

Snap Cure:

Quantifies the rate at which a liquid coating applied at the desired dry film thickness, on an appropriate substrate, and baked (cured) at 200° C. will become tack free when exposed to a fabric capable of detecting tack on an organic film. Tack of a coating is measured at the 200° C. temperature. Test conditions for the optimized test include; a dry film thickness of around 2.2+/−0.63 g/m², a sheet of end stock aluminum as the substrate, and a red, cotton laboratory 'rag' as the fabric. A tack free time of less than 30 seconds of curing time is the most desirable for roll coatings. Any tack free times of less than 30 seconds are considered a PASS, while times over 30 seconds are considered a FAIL.

Pasteurization Blush/Adhesion:

Measures the ability of a cured coating composition to resist discoloration (blushing) and adhesion loss (from the given substrate) when exposed to a typical beverage pasteurization sequence in deionized water. For roll coatings, a water temperature of 82° C. and a soaking time of 30 minutes is used. A roll coating is considered to PASS for blushing if no discoloration is observed following the pasteurization sequence. Any discoloration results in a FAIL.

Following the pasteurization sequence, the adhesion of the coating is assessed using a crosshatch adhesion test (~3.2 mm square pattern and standard #610 tape (available from 3M Company)). The tape is applied to crosshatched area and removed quickly at 90° from the substrate surface. A coating is said to display acceptable adhesion (considered a PASS) if 100% of the substrate surface remains coated following the pasteurization sequence. A coating is given a rating of FAIL if at least some of the substrate surface is exposed (i.e., some of the coating is removed) following the pasteurization sequence.

Solvent Resistance:

Measures the extent of resistance of a cured film towards abrasion/dissolution to rubbing repeatedly back and forth with a cloth soaked in methyl ethyl ketone MEK). The solvent resistance is quantified by the number of double rubs (back and forth once) until a break in the coating to the substrate has been established. For roll coatings an MEK resistance of at least 10 double rubs is desirable, preferred roll coatings have an MEK resistance of at least 20 double rubs, more preferred roll coatings have an MEK resistance of at least 40 double rubs.

Dry Film Appearance:

Describes the appearance of a cured film in terms of clarity, smoothness, etc., as determined by a qualitative visual analysis. For roll coatings, it is desired for the dried film to be clear, smooth, and glossy.

Example 1

Preparation of Polyacid Compounds

Run 1: Preparation of Polyacid Compound I

A reaction flask equipped with a stirrer, condenser tube, and inert gas inlet is charged with 57.2 g of diethylene glycol dimethyl either, (diglyme). A sparge of Nitrogen is begun, and some light agitation of the reaction flask initiated. The temperature of the flask is set for 170° C. In a separate vessel, methacrylic acid, 132.5 g (1.54 mol), 2-ethylhexyl acrylate, 66.2 g (0.36 mol), styrene, 22.1 g (0.21 mol), and dicumyl peroxide, 15.5 g (0.06 mol) is mixed. The mixture is gently stirred until the dicumyl peroxide dissolves. Once the diglyme has reached 170° C., the temperature set point is reduced to 162° C. The addition of the monomer/initiator mixture is started. The initiator/monomer mixture is added over a period of about 180 minutes. After the addition is complete, the temperature of the reaction flask is maintained for an additional 120 minutes to complete the polymerization process. A temperature range of 160-170° C. is maintained throughout the reaction time. Following the 120 minute holding time, the reaction flask is set for 100° C. Once the reaction has cooled to 100° C., benzoyl peroxide, 2.0 g (0.008 mol) is added. The reaction contents are maintained at 100° C. for an additional 60 minutes. After the 60-minute hold time, the reaction flask is set for a temperature of 90° C. A mixture of dimethyl ethanolamine, 48.0 g (0.54 mol) and deionized water 96.0 g is added to the reaction flask, over 10 minutes. The reaction temperature is maintained at 90° C. for 60 minutes. Following this 60-minute hold, the reaction flask is set for 80° C., and 331.0 g of deionized water is added, over a 60-minute period. Once the water addition is complete, the reaction flask is allowed to cool, under gentle agitation, to room temperature (~25° C.). The polyacid compound can be discharged and characterized for solution/chemical properties.

The polyacid compound yielded the following characteristics:

| | |
|---|---|
| Molecular Mass (MW) by Gel Permeation Chromatography | 2,630 Daltons |
| Solids Content (30 minutes at 160° C.) | 34.3% by Weight |
| Acid number (Titration with methanolic KOH) | 346.0 mg KOH/g |

Run 2: Preparation of Polyacid Compound II

The polyacid was prepared according to the procedure of Ex. 1, Run 1, except diglyme is replaced with diethylene glycol diethyl ether (ethyl diglyme) as the solvent during polymerization.

Run 3: Preparation of Polyacid Compound III

The polyacid was prepared according to the procedure of Ex. 1, Run 1, except diglyme is replaced with Ektapro EEP as the solvent during polymerization.

Run 4: Preparation of Polyacid Compound IV

A monomer/initiator mixture is prepared by combining methacrylic acid, 2360.0 g (27.4 mol), styrene, 1182.0 g (11.4 mol), ethyl acrylate, 394.0 g (3.94 mol), benzoyl peroxide, 253.4 g (1.0 mol), and 34.6 g of n-butanol. The mixture is gently mixed until all of the benzoyl peroxide has dissolved. Ten percent, by weight, of this mixture, is added to a reaction flask equipped with a stirrer, condenser tube, and inert gas inlet. In addition, 1632.6 g of n-butanol and 136.3 g of deionized water is also added to the reaction flask. A sparge of Nitrogen is started, and light agitation of the reaction flask is initiated. The temperature of the flask is set for 100° C. The remaining monomer/initiator premix is added uniformly over a period of 2.0 hours. A temperature of 100-110° C. is maintained throughout this time. Once all of the monomer/initiator premix has been added, the contents of the flask are maintained at 100-110° C. for an additional 2.5 hours, to complete the polymerization. After the 2.5 hour holding time, 2685.2 g of n-butanol, 189.0 g deionized water, and 1108.7 g 2-butoxy ethanol are added to the reaction flask. The contents of the reaction flask are allowed to cool to room temperature (~25° C.). The polyacid compound can be discharged for analysis.

The polyacid compound yielded the following characteristics:

| | |
|---|---|
| Molecular Mass (MW) by Gel Permeation Chromatography | 17,500 Daltons |
| Solids Content (30 minutes at 160° C.) | 39.6% by Weight |
| Acid number (Titration with methanolic KOH) | 381.0 mg KOH/g |

Run 5: Preparation of Polyacid Compound V

The polyacid was prepared according to the procedure of Ex. 1, Run 4, except that 2-butoxy ethanol is used in place of the n-butanol.

Run 6: Preparation of Polyacid Compound VI

The polyacid was prepared according to the procedure of Ex. 1, Run 5, except the monomer composition is (by weight) 60.0% methacrylic acid, 35% 2-ethylhexyl acrylate, and 5% styrene.

Run 7: Preparation of Polyacid Compound VII

The polyacid was prepared according to the procedure of Ex. 1, Run 6, except about 90% of the 2-butoxy ethanol charge is replaced by a solution of 22% (by weight) of dimethyl ethanol amine in deionized water.

Run 8: Preparation of Polyacid Compound VIII

The polyacid was prepared according to the procedure of Ex. 1, Run 1, except the resulting polyacid compound is not diluted by addition of dimethyl ethanolamine and deionized water.

Run 9: Preparation of Polyacid Compound IX

The polyacid was prepared according to the procedure of Ex. 1, Run 8, except the diglyme is replaced with ethyl diglyme.

Run 10: Preparation of Polyacid Compound X

A reaction flask equipped with a stirrer, condenser tube, and inert gas inlet is charged with 55.9 g of diethylene glycol dimethyl either, (diglyme). A sparge of Nitrogen is begun, and some light agitation of the reaction flask initiated. The temperature of the flask is set for 170° C. In a separate vessel, methacrylic acid, 158.6 g (1.84 mol), 2-ethylhexyl acrylate, 42.5 g (0.23 mol), styrene, 14.2 g (0.14 mol), and dicumyl peroxide, 15.5 g (0.06 mol) is mixed. The mixture is gently stirred until the dicumyl peroxide dissolves. Once the diglyme has reached 170° C., the temperature set point is reduced to 162° C. The addition of the monomer/initiator mixture is started. The initiator/monomer mixture is added over a period of about 180 minutes. After the addition is complete, the temperature of the reaction flask is maintained for an additional 120 minutes to complete the polymerization process. A temperature range of 160-170° C. is maintained throughout the reaction time. Following the 120 minute holding time, the reaction flask is set for 100° C. Once the reaction has cooled to 100° C., benzoyl peroxide, 2.0 g (0.008 mol) is added. The reaction contents are maintained at 100° C. for an additional 60 minutes. After the 60-minute hold time, the reaction flask is cooled and discharged. The polyacid compound can be discharged and characterized for solution/chemical properties.

The polyacid compound yielded the following characteristics:

| | |
|---|---|
| Molecular Mass (MW) by Gel Permeation Chromatography | 2810 Daltons |
| Solids Content (30 minutes at 160° C.) | 83.4% by Weight |
| Acid number (Titration with methanolic KOH) | 425 mg KOH/g |

Example 2

Preparation of Polyhydroxyl Compounds

Run 1: Preparation of Polyhydroxyl Compound I

A reaction flask equipped with a stirrer, condenser tube, and inert gas inlet is charged with 1000.0 g of diethylene glycol n-butyl ether, (butyl carbitol), and 440.0 g of dimethyl ethanolamine (4.94 equiv.). Gentle agitation is initiated to form a uniform solution of the amine and the solvent. Glacial acetic acid, 330.0 g (5.5 equiv.) is charged to the reaction flask. The flask is set for a temperature of 55° C. In a separate vessel, 645.0 g of butyl carbitol and 930.0 g of Epon 828 (4.9 equiv.) epoxy resin is mixed. The mixture is gently stirred until the solution of solvent and resin is homogeneous. The Epon 828 solution is slowly added to the reaction flask over a 60-minute period. Adequate cooling is provided to maintain the temperature of the reaction flask at <95° C. After the Epon 282 solution has been added, the reaction flask is maintained 80° C. for 60 minutes. After the 60-minute hold is complete, the reaction flask is cooled to room temperature (~25° C.). The resin solution can be discharged from the flask for analysis.

The Polyhydroxyl compound yielded the following characteristics:

| | |
|---|---|
| Solids Content (60 minutes at 110° C.) | 50.7% (by Weight) |
| Theoretical Hydroxyl Number | 7.1 mmol OH/g |
| Residual Acid Value (titration with methanolic KOH) | 31.0 mg KOH/g |

Run 2: Preparation of Polyhydroxyl Compound II

The polyhydroxyl compound was prepared according to the procedure of Ex. 2, Run 1, except the charge of the dimethyl ethanol amine is reduced by 50% to 220.0 g.

The Polyhydroxyl compound yielded the following characteristics:

| | |
|---|---|
| Solids Content (60 minutes at 110° C.) | 47.5% (by Weight) |
| Theoretical Hydroxyl Number | 6.4 mmol OH/g |
| Residual Acid Value (titration with methanolic KOH) | 12.0 mg KOH/g |

Run 3: Preparation of Polyhydroxyl Compound III

The polyhydroxyl compound was prepared according to the procedure of in Ex. 2, Run 2, except the charge of butyl carbitol is replaced with butyl cellosolve.

Run 4: Preparation of Polyhydroxyl Compound IV

The polyhydroxyl compound was prepared according to the procedure of Ex. 2, Run 3, except 50% of the butyl cellosolve is replaced with deionized water.

Run 5: Preparation of Polyhydroxyl Compound V

A reaction flask equipped with a stirrer, condenser tube, and inert gas inlet is charged with Epon 828, 332.9 g (1.764 equiv.) and 50.0 g of butyl cellosolve. The mixture is gently agitated until it is homogeneous. A sparging with nitrogen is initiated. Ethanolamine, 117.1 g (3.84 equiv.) is added to the mixture. The mixture is allowed to exotherm to a maximum of 100° C. After the exotherm, the reactor is maintained at 80° C. to complete the reaction. Deionized water, 142.9 g, is added to the flask to reduce the viscosity of the mixture. The contents of the reaction flask are cooled to room temperature (~25° C.). The polyhydroxyl can be discharged for analysis.

The Polyhydroxyl compound yielded the following characteristics:

| | |
|---|---|
| Solids Content (60 minutes at 110° C.) | 59.7% (by Weight) |
| Theoretical Hydroxyl Number | 9.1 mmol OH/g |

Example 3

In-situ Preparation of Polyhydroxyl Compound with a Polyacid Compound 446.9 g of the polyacid compound solution prepared in Ex. 1, Run 8 is charged to a reaction flask equipped with a condenser, stirrer, and inert gas inlet. The contents are cooled to 100° C. and 111.2 g butyl carbitol, 158.4 g of Syn Fac 8009, and 170.7 g Epon 828 are added under light agitation and mixed for 10 minutes until uniform. To this mixture is added 104.7 g of dimethyl ethanolamine over a time period of 10-15 minutes. The mixture is allowed to exotherm, and adequate cooling is provided so that the exotherm temperature does not exceed 110° C. The mixture is held for a total of 30 minutes. Following the 30-minute hold time, 967.5 g of deionized water is added to reduce the viscosity of the resin solution. The resulting solution was a clear, brownish solution with a solids content of 41.1% by weight (60 minutes at 110° C.).

Example 4

In-Situ Preparation of Polyhydroxyl Compound with a Polyacid Compound

The same components and reaction process were used as in Example 3, except the polyacid solution used was prepared as in Ex. 1, Run 9.

Example 5

Preparation of Polyacid Solution

A reaction flask equipped with a stirrer, condenser tube, and inert gas inlet is charged with 5166 g of deionized water. To the water is added 3500 g of SMA XGA-10 flake resin (available from Elf Atochem) and 1334 g of dimethyl ethanolamine. The reaction components are maintained at 80° C. for 8 hours, until all of the SMA resin has been hydrolyzed and dissolved. The resulting resin is a clear, brownish solution with a solids content of 39.2% by weight (20 minute at 204° C.).

Comparative Example 6

General Description of Composition of Comparative Coating 1

A sample of commercially available beer & beverage exterior varnish (# 22Q02AA Two-piece Exterior Varnish (available from The Valspar Corporation, Minneapolis, Minn.)) was used as a "control" sample. This coating has been determined to be commercially viable and is regarded as formaldehyde containing. This coating will herein be referred to as Coating 1 in the solution and film property evaluations.

Comparative Example 7

General Description of Composition of Comparative Coating 2

A sample of an epoxy and acrylic based aqueous dispersion (# 10Q45AA two-piece water-based inside spray (available from The Valspar Corporation)) was used as a "control" sample. The sample is essentially composed of an epoxy resin, and high molecular weight acrylic type resins. This coating will herein be referred to as Coating 2 in the solution and film property evaluations.

Example 8

Preferred Formaldehyde-Free Coatings

Several coatings were made by blending the following raw materials.

| Raw Material | Description | Coating 3 (Parts) | Coating 4 (Parts) | Coating 5 (Parts) |
|---|---|---|---|---|
| Example 1, Run 1 | Polyacid Compound I | 34.4 | 0.0 | 0.0 |
| Example 2, Run 2 | Polyhydroxyl Compound II | 15.6 | 0.0 | 0.0 |
| Example 3 | In-Situ Prepared Polyacid/Polyol | 0.0 | 50.11 | 0.0 |
| Example 4 | In-Situ Prepared Polyacid/Polyol | 0.0 | 0.0 | 50.11 |
| Example 5 | Polyacid Solution I | 28.2 | 28.43 | 28.4 |
| 2-Butoxy Ethanol | Organic Solvent | 0.0 | 3.38 | 3.38 |
| Deionized Water | VOC Compliant Solvent | 14.6 | 12.9 | 12.4 |
| Additives | Internal lubricants, wetting aids, etc. | 7.2 | 5.18 | 5.71 |

Example 9

Film Property Analysis of Various Coatings

The following coatings were evaluated using the previously described tests.

| Coating Sample: | Coating 1 | Coating 2 | Coating 3 | Coating 4 | Coating 5 |
|---|---|---|---|---|---|
| Solution Viscosity (seconds) | 60 | 20 | 65 | 90 | 90 |
| Non-Volatile Content (%) | 37.1% | 20.0% | 41.3% | 35.7% | 36.6% |
| Calculated VOC Content (kg/l) | .19 | .35 | .24 | .23 | .25 |
| Wet Solution Appearance (visual) | Clear Compatible | Opaque Compatible | Clear Compatible | Clear Compatible | Clear Compatible |
| Misting/Slinging | 9-10 | 0-2 | 8-9 | 7-8 | 7-8 |
| Air Drying | PASS | FAIL | PASS | PASS | PASS |
| Snap Cure[1] | PASS | PASS | PASS | PASS | PASS |
| Pasteurization Blush[2,3] | PASS | PASS | PASS | PASS | PASS |
| Pasteurization Adhesion[2,3] | PASS | PASS | PASS | PASS | PASS |
| Solvent Resistance[3] (MEK Double Rubs) | >50 | 20-30 | >50 | >50 | >50 |

-continued

| Coating Sample: | Coating 1 | Coating 2 | Coating 3 | Coating 4 | Coating 5 |
|---|---|---|---|---|---|
| Dry Film[2] Appearance (Visual) | Clear Smooth | Clear Smooth | Clear Smooth | Clear Smooth | Clear Smooth |

[1] 30 seconds at 200° C. Cut-Off Criterion, End Stock Aluminum
[2] Curing Conditions: Substrate: Commercially Available Aluminum Beer/Beverage Cans; Curing Cycle: 45 seconds at 200° C., +2.5 minutes at 200° C.
[3] 30 minutes at 82° C. in deionized water Example 10

In-situ Preparation of Polyhydroxyl Compound with a Polyacid Compound 286.3 g of the polyacid compound solution prepared in Ex. 1, Run 10 is charged to a reaction flask equipped with a condenser, stirrer, and inert gas inlet. The contents are heated to 100° C. and 40.2 g of Syn Fac 8009, 113.2 g dimethyl ethanol amine, and 260 g deionized water are added under light agitation and mixed for 30 minutes until uniform. To this mixture is added 58.4 g of EPON 828. The mixture is allowed to exotherm, and adequate cooling is provided so that the exotherm temperature does not exceed 115° C. The mixture is held for a total of 5-10 minutes. Following the 5-10 minute hold time, 282.9 g of deionized water is added to reduce the viscosity of the resin solution. The resulting solution was a clear, brownish solution with a solids content of 41.1% by weight (60 minutes at 110° C.).

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated. Various modifications and alterations of this invention will become apparent to those skilled in the art without departing from the scope and spirit of this invention.

What is claimed is:

1. A hardenable packaging coating composition, comprising:
   a polyacid compound comprising a homopolymer or a copolymer derived from a compound selected from the group consisting of acrylic acid, methacrylic acid, maleic acid, crotonic acid, salts thereof and mixtures thereof, wherein the polyacid compound has a weight average molecular weight between about 750 and 10,000 Daltons and an acid number from 250 to 600;
   a polyhydroxyl compound, separate from the first compound, comprising a quaternized epoxy resin, wherein the polyhydroxyl compound has a weight average molecular weight between about 300 and 5,000 Daltons; and
   a liquid carrier,
   wherein the hardenable packaging coating composition is substantially formaldehyde free.

2. A coating composition according to claim 1, wherein the polyacid compound is derived from methacrylic acid.

3. A coating composition according to claim 1, wherein the polyacid compound has a weight average molecular weight of from about 1,000 to about 5,000 Daltons.

4. A coating composition according to claim 1, further comprising a third compound having active hydrogen groups.

5. A coating composition according to claim 4, wherein the third compound contains active hydrogen groups selected from the group consisting of hydroxyl groups, primary amino groups, secondary amino groups, thiol groups, and combinations thereof.

6. A coating composition according to claim 4, wherein the third compound is selected from the group consisting of glycerol, ethylene glycol, propylene glycol, trimethylol propane, triethylolethane, ethylene diamine, ethanolamine, propanolamine, butanolamine, pentanol amine, diethanolamine, triethanolamine, pentaerythritol, sorbitol, sucrose, bisphenol A, a quaternized epoxy resin, polyvinyl alcohol, trihydroxyethyl isocyanurate resorcinol, catechol, gallol, polymeric polyols, and mixtures thereof.

7. A coating composition according to claim 1, wherein the composition has a solids content of from about 20% to about 80% by weight.

8. A coating composition according to claim 1, which has a #4 Ford cup viscosity of about 40 to about 90 seconds at 25° C.

9. A coating composition according to claim 1, which has no more than slight misting as determined with the misting/slinging test method.

10. A coating composition according to claim 1, wherein the carrier comprises water.

11. A coating composition according to claim 1, wherein the composition has a volatile organic compound level of less than 0.25 kg/l of coating composition and solvent.

12. A coating composition according to claim 1, wherein the composition is in the form of an exterior varnish.

13. A coating composition according to claim 1, wherein the composition remains tacky for at least 15 minutes at room temperature when applied to yield a dry film thickness of 2.2+/−0.63 g/m$^2$.

14. The coating composition according to claim 1, wherein the quaternized epoxy resin is derived from an epoxy resin that comprises at least two epoxide groups.

15. The coating composition according to claim 14, wherein the epoxide groups are terminal epoxide groups.

16. A hardenable packaging coating composition, comprising: (a) a polyacid compound comprising a homopolymer or a copolymer derived from a compound selected from the group consisting of acrylic acid and methacrylic acid, salts thereof and mixtures thereof, wherein the polyacid compound has an acid number from 250 to 600 and a weight average molecular weight between about 750 and 10,000 Daltons; and (b) quaternized epoxy resin having a weight average molecular weight between about 300 and 5000 Daltons; and a liquid carrier comprising water, wherein the hardenable packaging coating composition has no more than slight misting as determined with the misting/slinging test method and can be rapidly cured to a substantially tack-free state in less than about one minute at 200° C., and wherein the coating composition is essentially formaldehyde free.

17. A coating composition according to claim 16, wherein the first compound has a weight average molecular weight between about 1000 5000 Daltons.

* * * * *